United States Patent
Wu et al.

(10) Patent No.: US 12,402,193 B2
(45) Date of Patent: Aug. 26, 2025

(54) METHODS AND APPARATUSES FOR PROCESSING A RADIO LINK FAILURE (RLF) DURING A DUAL ACTIVE PROTOCOL STACK (DAPS) HANDOVER PROCEDURE

(71) Applicant: Lenovo (Beijing) Ltd., Beijing (CN)

(72) Inventors: Lianhai Wu, Chaoyang (CN); Haiming Wang, Xicheng District (CN)

(73) Assignee: Lenovo (Beijing) Limited, Beijing (CN)

( * ) Notice: Subject to any disclaimer, the term of this patent is extended or adjusted under 35 U.S.C. 154(b) by 398 days.

(21) Appl. No.: 18/004,367

(22) PCT Filed: Jul. 10, 2020

(86) PCT No.: PCT/CN2020/101428
§ 371 (c)(1),
(2) Date: Jan. 5, 2023

(87) PCT Pub. No.: WO2022/006884
PCT Pub. Date: Jan. 13, 2022

(65) Prior Publication Data
US 2023/0284113 A1    Sep. 7, 2023

(51) Int. Cl.
*H04W 76/20* (2018.01)
*H04W 36/18* (2009.01)
(Continued)

(52) U.S. Cl.
CPC ........... *H04W 76/20* (2018.02); *H04W 36/18* (2013.01); *H04W 36/305* (2018.08); *H04W 76/30* (2018.02)

(58) Field of Classification Search
None
See application file for complete search history.

(56) References Cited

U.S. PATENT DOCUMENTS 12,069,526 B2 *  8/2024  Tsuboi ................. H04W 36/18
2022/0264680 A1 *  8/2022  Kim ...................... H04W 76/15
(Continued)

FOREIGN PATENT DOCUMENTS

| CN | 111315018 A | 6/2020 |
| CN | 111328118 A | 6/2020 |
| WO | 2020088592 A1 | 5/2020 |

OTHER PUBLICATIONS

Ericsson , "[E232] Source and target entities at DAPS HO", 3GPP TSG-RAN WG2 #110-e, Tdoc R2-2004693, Electronic meeting [retrieved Dec. 29, 2022]. Retrieved from the Internet <https://www.3gpp.org/ftp/TSG_RAN/WG2_RL2/TSGR2_110-e/Docs/>., Jun. 2020, 24 Pages.
(Continued)

*Primary Examiner* — Anh Vu H Ly
(74) *Attorney, Agent, or Firm* — FIG. 1 Patents

(57) ABSTRACT

Embodiments of the present application relate to methods and apparatuses for processing a radio link failure (RLF) of a target master cell group (MCG) during a dual active protocol stack (DAPS) handover procedure. According to an embodiment of the present application, a method includes: receiving a radio resource control (RRC) reconfiguration message, wherein the RRC reconfiguration message includes dual active protocol stack (DAPS) configuration information and a reconfiguration with synchronization information element; synchronizing to a target master node (MN); synchronizing to a target secondary node (SN) in response to a bearer associated with a secondary cell group (SCG) being configured; and upon detecting a radio link failure (RLF) of a target MCG, initiating a fast MCG link recovery procedure during a DAPS handover procedure. In addition, both SN and MN in a source connection are
(Continued)

released in response to receiving an indication from a target connection indicating to release the source connection.

20 Claims, 5 Drawing Sheets

(51) Int. Cl.
  *H04W 36/30* (2009.01)
  *H04W 76/30* (2018.01)

(56) References Cited

U.S. PATENT DOCUMENTS

| | | | |
|---|---|---|---|
| 2023/0189110 A1* | 6/2023 | Wu | H04W 36/185 |
| | | | 370/331 |
| 2023/0189112 A1* | 6/2023 | Wu | H04W 36/00837 |
| | | | 455/437 |
| 2023/0217291 A1* | 7/2023 | Teyeb | H04W 76/19 |
| | | | 370/241 |
| 2023/0422137 A1* | 12/2023 | Wu | H04W 36/0079 |

OTHER PUBLICATIONS

Intel Corporation, "DAPS failure handling", 3GPP TSG RAN WG2 Meeting #108, R2-1914840, Reno, USA [retrieved Dec. 29, 2022]. Retrieved from the Internet <https://www.3gpp.org/ftp/tsg_ran/WG2_RL2/TSGR2_108/Docs>., Nov. 2019, 4 Pages.

Lenovo, "[B105] TP for DAPS handover with fast MCG link recovery", 3GPP TSG-RAN WG2 Meeting #110 electronic, R2-2005134, Online [retrieved Dec. 29, 2022]. Retrieved from the Internet <https://www.3gpp.org/ftp/tsg_ran/WG2_RL2/TSGR2_110-e/Docs>., Jun. 2020, 2 Pages.

PCT/CN2020/101428, "International Preliminary Report on Patentability", PCT Application No. PCT/CN2020/101428, Jan. 19, 2023, 5 pages.

PCT/CN2020/101428, "International Search Report and Written Opinion", PCT Application No. PCT/CN2020/101428, Mar. 31, 2021, 6 pages.

* cited by examiner

METHODS AND APPARATUSES FOR PROCESSING A RADIO LINK FAILURE (RLF) DURING A DUAL ACTIVE PROTOCOL STACK (DAPS) HANDOVER PROCEDURE

TECHNICAL FIELD

Embodiments of the present application generally relate to wireless communication technology, especially to methods and apparatuses for processing a radio link failure (RLF) of a target master cell group (MCG) during a dual active protocol stack (DAPS) handover procedure.

BACKGROUND

When a RLF or handover failure (HOF) occurs for a user equipment (UE), the UE may perform a radio resource control (RRC) re-establishment procedure. The UE may access a cell by a successful RRC re-establishment procedure, or access a cell by a connection setup procedure in response to an unsuccessful a RRC re-establishment procedure.

As specified in 3rd Generation Partnership Project (3GPP) standard documents, a DAPS handover procedure is introduced to continue the downlink user data reception from a source base station (BS) until releasing a source cell and to continue the uplink user data transmission to the source BS until successfully random accessing to a target BS.

3GPP 5G networks are expected to increase network throughput, coverage, and robustness and reduce latency and power consumption. With the development of 3GPP 5G networks, various aspects need to be studied and developed to perfect the 5G technology.

SUMMARY

One objective of embodiments of the present disclosure is to provide novel mechanisms of processing a RLF during a DAPS handover procedure.

Some embodiments of the present application provide a method, which may be performed by a UE, e.g., a transmission UE. The method includes: receiving a RRC reconfiguration message, wherein the RRC reconfiguration message includes DAPS configuration information and a reconfiguration with synchronization information element; synchronizing to a target master node (MN); synchronizing to a target secondary node (SN) in response to a bearer associated with a secondary cell group (SCG) being configured; and upon detecting a RLF of a target MCG, initiating a fast MCG link recovery procedure during a DAPS handover procedure.

Some embodiments of the present application also provide an apparatus for wireless communications. The apparatus includes: a non-transitory computer-readable medium having stored thereon computer-executable instructions; a receiving circuitry; a transmitting circuitry; and a processor coupled to the non-transitory computer-readable medium, the receiving circuitry and the transmitting circuitry, wherein the computer-executable instructions cause the processor to implement the above-mentioned method performed by a transmission UE.

Some embodiments of the present application provide a method, which may be performed by a UE, e.g., a reception UE. The method includes: receiving dual connectivity (DC) configuration information; receiving a RRC reconfiguration message, wherein the RRC reconfiguration message includes DAPS configuration information and a reconfiguration with synchronization information element; performing a random access procedure; and in response to accessing to a target cell, receiving another RRC reconfiguration message from a target BS, wherein the abovementioned another RRC reconfiguration message includes an indication to release a source connection.

Some embodiments of the present application also provide an apparatus for wireless communications. The apparatus includes: a non-transitory computer-readable medium having stored thereon computer-executable instructions; a receiving circuitry; a transmitting circuitry; and a processor coupled to the non-transitory computer-readable medium, the receiving circuitry and the transmitting circuitry, wherein the computer-executable instructions cause the processor to implement the above-mentioned further method performed by a reception UE.

The details of one or more examples are set forth in the accompanying drawings and the descriptions below. Other features, objects, and advantages will be apparent from the descriptions and drawings, and from the claims.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

DETAILED DESCRIPTION

The detailed description of the appended drawings is intended as a description of preferred embodiments of the present application and is not intended to represent the only form in which the present application may be practiced. It should be understood that the same or equivalent functions may be accomplished by different embodiments that are intended to be encompassed within the spirit and scope of the present application.

Reference will now be made in detail to some embodiments of the present application, examples of which are illustrated in the accompanying drawings. To facilitate understanding, embodiments are provided under specific network architecture and new service scenarios, such as 3GPP 5G, 3GPP LTE Release 8 and so on. It is contemplated that along with developments of network architectures and new service scenarios, all embodiments in the present application are also applicable to similar technical problems; and moreover, the terminologies recited in the present application may change, which should not affect the principle of the present application.

Next generation radio access network (NG-RAN) supports a multi-radio dual connectivity (MR-DC) operation. In the MR-DC operation, a UE with multiple transceivers may be configured to utilize resources provided by two different nodes connected via non-ideal backhauls. Wherein one node may provide NR access and the other one node may provide either evolved-universal mobile telecommunication system (UMTS) terrestrial radio access (UTRA) (E-UTRA) or NR access. One node may act as a master node (MN) and the other node may act as a secondary node (SN). The MN and SN are connected via a network interface (for example, Xn interface as specified in 3GPP standard documents), and at least the MN is connected to the core network.

Figure 1:
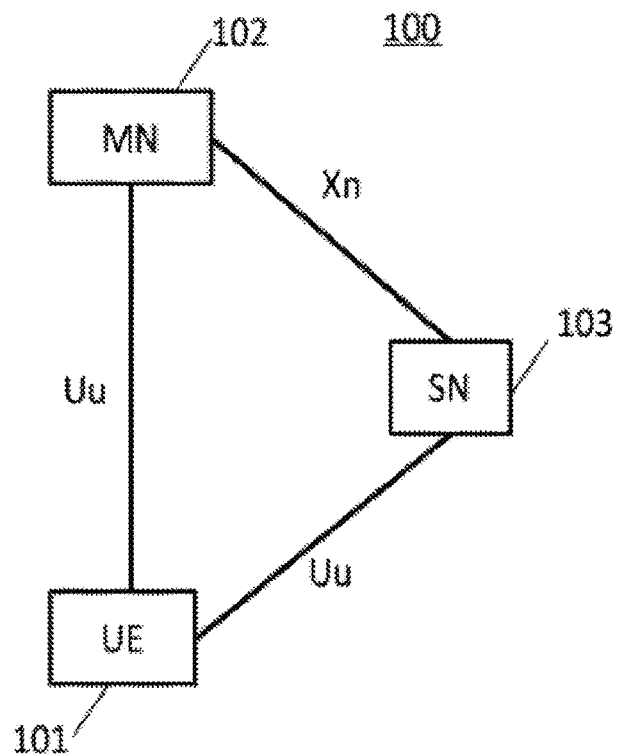
FIG. 1 illustrates a schematic diagram of a wireless communication system in accordance with some embodiments of the present application.

FIG. 1 illustrates a schematic diagram of a wireless communication system in accordance with some embodiments of the present application.

As shown in FIG. 1, the wireless communication system 100 may be a dual connectivity system 100 includes at least one UE 101, at least one MN 102, and at least one SN 103. In particular, the dual connectivity system 100 in FIG. 1 includes one shown UE 101, one shown MN 102, and one shown SN 103 for illustrative purpose. Although a specific number of UEs 101, MNs 102, and SNs 103 are depicted in FIG. 1, it is contemplated that any number of UEs 101, MNs 102, and SNs 103 may be included in the wireless communication system 100.

Referring to FIG. 1, the UE 101 may be connected to the MN 102 and the SN 103 via a network interface, for example, Uu interface as specified in 3GPP standard documents. The MN 102 and the SN 103 may be connected with each other via a network interface, for example, Xn interface as specified in 3GPP standard documents. The MN 102 may be connected to the core network via a network interface (not shown in FIG. 1). The UE 102 may be configured to utilize resources provided by the MN 102 and the SN 103 to perform data transmission.

The MN 102 may refer to a radio access node that provides a control plane connection to the core network. In an embodiment of the present application, in the E-UTRA-NR DC (EN-DC) scenario, the MN may be an eNB. In another embodiment of the present application, in the next generation E-UTRA-NR DC (NGEN-DC) scenario, the MN may be an ng-eNB. In yet another embodiment of the present application, in the NR-DC scenario or the NR-E-UTRA DC (NE-DC) scenario, the MN may be a gNB.

The MN 102 may be associated with a MCG. The MCG may refer to a group of serving cells associated with the MN 102, and may include a primary cell (PCell) and optionally one or more secondary cells (SCells) of the MCG. The PCell may provide a control plane connection to the UE 101.

The SN 103 may refer to a radio access node without a control plane connection to the core network but providing additional resources to the UE 101. In an embodiment of the present application, in the EN-DC scenario, the SN 103 may be an en-gNB. In another embodiment of the present application, in the NE-DC scenario, the SN 103 may be a ng-eNB. In yet another embodiment of the present application, in the NR-DC scenario or the NGEN-DC scenario, the SN 103 may be a gNB.

The SN 103 may be associated with a SCG. The SCG may refer to a group of serving cells associated with the SN 103, and may include a primary secondary cell (PSCell) and optionally one or more SCells.

The PCell of the MCG and the PSCell of the SCG may also be referred to as a special cell (SpCell).

In some embodiments of the present application, the UE 101 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. In some other embodiments of the present application, the UE 101 may include a portable wireless communication device, a smart phone, a cellular telephone, a flip phone, a device having a subscriber identity module, a personal computer, a selective call receiving circuitry, or any other device that is capable of sending and receiving communication signals on a wireless network. In some other embodiments of the present application, the UE 101 may include wearable devices, such as smart watches, fitness bands, optical head-mounted displays, or the like. Moreover, the UE 101 may be referred to as a subscriber unit, a mobile, a mobile station, a user, a terminal, a mobile terminal, a wireless terminal, a fixed terminal, a subscriber station, a user terminal, or a device, or described using other terminology used in the art.

In 3GPP Release 16, a fast MCG link recovery procedure is introduced for a MR-DC scenario. The fast MCG link recovery procedure may be also referred to as a MCG failure information procedure. The purpose of this procedure is to inform a RLF in a MCG to a MN via a SN connected to a UE, such that the UE in RRC_CONNECTED state may initiate the fast MCG link recovery procedure to quickly continue a RRC connection without performing a RRC re-establishment procedure.

Figure 2:
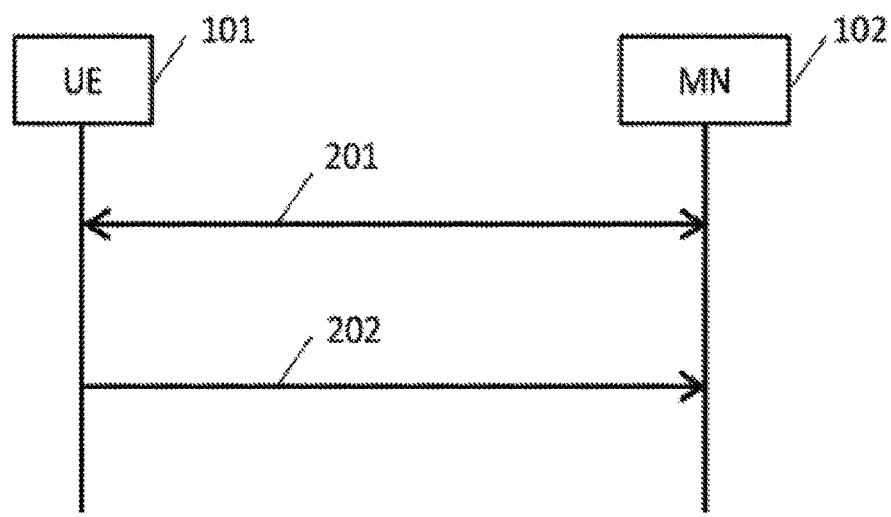
FIG. 2 illustrates an exemplary flowchart of a failure information procedure in accordance with some embodiments of the present application.

FIG. 2 illustrates an exemplary flowchart of a failure information procedure in accordance with some embodiments of the present application. The embodiments of FIG. 2 may refer to a MCG failure information procedure.

Specifically, in operation 201 as shown in FIG. 2, UE 101 and MN 102 (e.g., as shown and illustrated in FIG. 1) may communicate RRC reconfiguration information. In operation 202 as shown in FIG. 2, in the case that a failure for a MCG happens, the UE 101 may initiate (or, trigger) a MCG failure information procedure (i.e., a fast MCG link recovery procedure) and transmit a message associated with the failure for a MCG to the MN 102. For example, the failure for the MCG may refer to a RLF happening in a PCell of the MCG. The message associated with the failure for the MCG in operation 202 may be a MCGFailureInformation message as specified in 3GPP standard documents.

In the embodiments of a MCG failure information procedure, the UE 101 may not directly transmit the message associated with the failure for the MCG to the MN 102. Instead, the UE 101 may transmit the message associated with the failure for the MCG to a SN (e.g., SN 103 as shown and illustrated in FIG. 1), and then the SN may transfer the message received from the UE 101 to the MN 102.

For example, the UE 101 may be configured with a split signaling radio bearer (SRB) 1 or SRB3 to report the MCG failure information when a failure for the MCG happens. In the case that split SRB1 is configured, the UE 101 may submit the MCGFailureInformation message to low layer(s), e.g., for transmission via SRB1.

In the case that SRB3 is configured, the UE 101 may submit the MCGFailureInformation message to low layer(s), e.g., for transmission via SRB3. For instance, the MCGFailureInformation message may be embedded in NR RRC message ULInformationTransferMRDC as specified in 3GPP standard documents for transmission via SRB3.

When or after transmitting the message in operation 202, the UE 101 may start a timer associated with a fast MCG link recovery procedure. In an embodiment of the present application, the timer associated with a fast MCG link recovery procedure may be T316 as specified in 3GPP standard documents.

After receiving the message associated with the failure for the MCG, the MN 102 may further transmit a response message to the UE 101. The response message may be a RRC reconfiguration message including a handover (HO) command for a cell. The response message may be a RRC release message. In an embodiment of the present application, the HO command may be reconfigurationWithSync information element (IE) as specified in 3GPP standard documents. The MN 102 may not directly transmit the response message to the UE 101. Instead, the MN 102 may transmit the response message to a SN (e.g., SN 103 as shown and illustrated in FIG. 1), and then the SN may transfer the response message to the UE 101.

In the case that SRB3 is configured for transmitting the message associated with the failure for the MCG, after receiving the response message from the MN 102, the SN 103 may encapsulate the response message in a DLInformationTransferMRDC message as specified in 3GPP standard documents, and then transmit the DLInformationTransferMRDC message to the UE 101.

In the abovementioned embodiments of a MCG failure information procedure, the UE 101 may set a MCG failure type (referred to as "failureType") as follows:

If the UE 101 initiates a transmission of the MCGFailureInformation message as shown in operation 202, due to expiry of a timer T310 (which may be referred to as a physical layer problem timer) as specified in 3GPP standard documents, the UE 101 sets the failureType as t310-Expiry as specified in 3GPP standard documents.

If the UE 101 initiates a transmission of the MCGFailureInformation message as shown in operation 202, to provide a random access problem indication from of a medium access control (MAC) layer of a MCG, the UE 101 sets the failureType as randomAccessProblem as specified in 3GPP standard documents.

If the UE 101 initiates a transmission of the MCGFailureInformation message as shown in operation 202, to provide indication from MCG radio link control (RLC) that the maximum number of retransmissions has been reached, the UE 101 sets the failureType as rlcMaxNumRetx as specified in 3GPP standard documents.

In a case of implementing a DAPS handover procedure, a UE continues to receive downlink user data from a source BS until releasing a source connection (i.e., a source link) of the source BS, and the UE continues to transmit uplink user data transmission(s) to the source BS until successfully completing a random access procedure to a target BS. When the DAPS handover procedure fails, the UE may report a DAPS handover (HO) failure via the source BS without triggering a RRC re-establishment procedure if the source connection has not been released.

In a control plane handling in handover associated with a DAPS handover procedure, messages are directly exchanged between the BSs. A specific example is shown in FIG. 3 as below.

Figure 3:
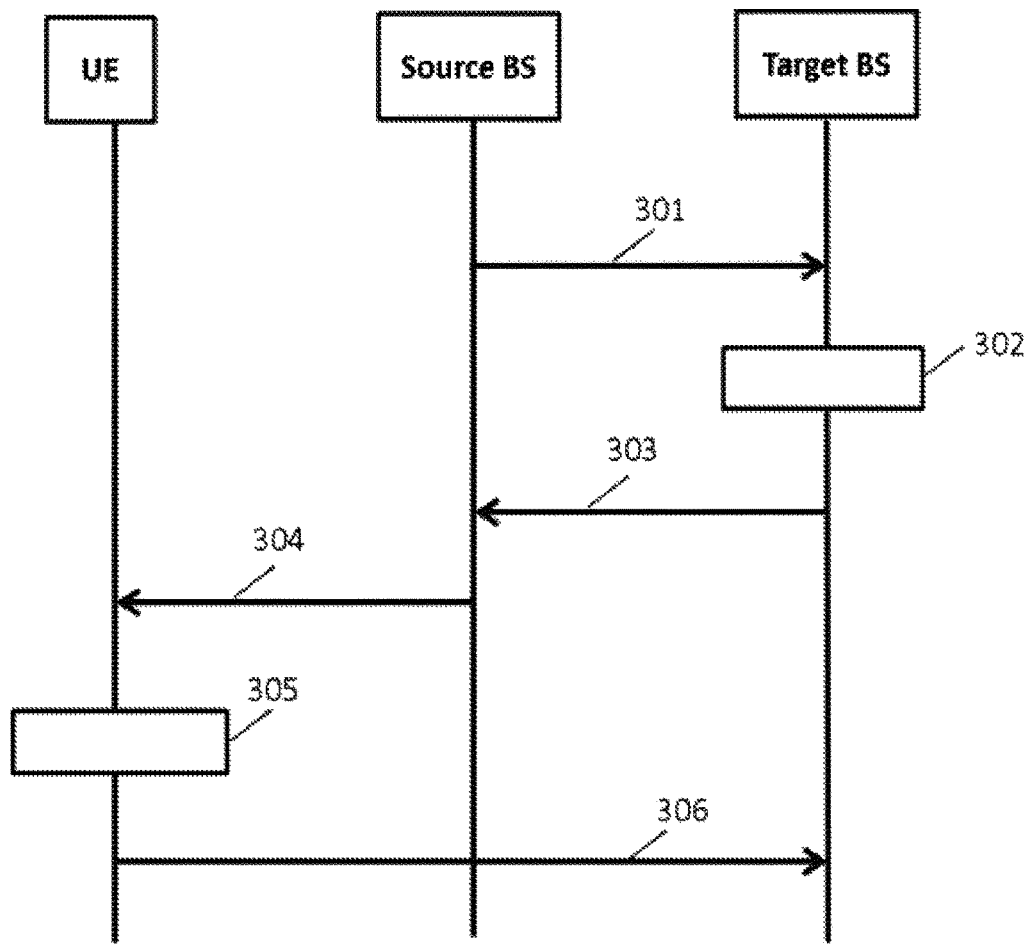
FIG. 3 illustrates an exemplary flowchart of an inter-BS handover procedure in accordance with some embodiments of the present application.

FIG. 3 illustrates an exemplary flowchart of an inter-BS handover procedure in accordance with some embodiments of the present application.

Referring to the embodiments of FIG. 3, in operation 301, a source BS may transmit a HANDOVER REQUEST message to a target BS. For example, the HANDOVER REQUEST message may pass a transparent RRC container with necessary information to prepare a handover procedure at the target BS side.

In operation 302, the target BS may perform admission control based on the load of a target cell of the target BS, to decide whether to allow the handover procedure of the UE after receiving the HANDOVER REQUEST message from the source BS.

In operation 303, based on an admission control result, the target BS may prepare handover resource(s) for the UE and send HANDOVER REQUEST ACKNOWLEDGE including a RRC reconfiguration message to the source BS.

In operation 304, a RAN handover initiation is performed. The source BS may transmit a RRC reconfiguration message to the UE. The RRC reconfiguration message may include a reconfiguration with synchronization IE, e.g., reconfigurationWithSync IE as specified in 3GPP standard documents. The RRC reconfiguration message may contain information required to access the target cell of the target BS.

In operation 305, the UE may access to the target cell and complete the handover procedure. In operation 306, the UE may send a RRCReconfigurationComplete message to the target BS.

In some embodiments, after implementing a DAPS handover procedure, the UE continues the downlink user data reception from the source BS until releasing the source connection, and the UE continues the uplink user data transmission to the source BS until successful random access procedure to the target BS.

Following Table 1 shows two timers specified in 3GPP standard documents, including a starting condition, a stop condition, and an operation at expiry.

TABLE 1

| Timer | Start | Stop | At expiry |
|---|---|---|---|
| T310 | Upon detecting physical layer problems for the SpCell i.e. upon receiving N310 consecutive out-of-sync indications from lower layers. | Upon receiving N311 consecutive in-sync indications from lower layers for the SpCell, upon receiving RRCReconfiguration with reconfigurationWithSync for that cell group, and upon initiating the connection re-establishment procedure. Upon SCG release, if the T310 is kept in SCG. | If the T310 is kept in MCG: If AS security is not activated: go to RRC_IDLE state else: initiate the MCG failure information procedure as specified in sub-clause 5.7.3b of TS38.331 or the connection re-establishment procedure as specified in sub-clause 5.3.7 of TS38.331. |

TABLE 1-continued

| Timer | Start | Stop | At expiry |
|---|---|---|---|
| T316 | Upon transmission of the MCGFailureInformation message | Upon resumption of MCG transmission, upon reception of RRCRelease, or upon initiating the re-establishment procedure | Perform the actions as specified in sub-clause 5.7.3b.5 of TS38.331. |

In some embodiments of the present application, a UE may trigger a fast MCG link recovery procedure, rather than a RRC re-establishment procedure, after the UE successfully performs a RA procedure but before releasing a source connection if a DAPS handover procedure is supported while a target cell is configured with a DC operation. Then, the UE may release a source connection when the UE triggers the fast MCG link recovery procedure at the target cell.

In one embodiment, upon initiating a fast MCG link recovery procedure at a target cell, the UE releases resource(s) of a source cell. In particular, the UE may perform the following behaviors.

If any DAPS bearer is configured,
  the UE releases source SpCell configuration information;
  the UE resets source MAC configuration information and releases the source MAC configuration information;
  for each DAPS bearer, the UE releases the RLC entity or entities, and the associated logical channel for the source SpCell and the UE reconfigures the PDCP entity to release DAPS configuration information;
  for each SRB, the UE releases the PDCP entity for the source SpCell and release the RLC entity, and the associated logical channel for the source SpCell;
  the UE releases the physical channel configuration information for the source SpCell; and/or
  the UE discards access stratum (AS) security key(s) used in the source SpCell, if there is any such key(s).

In a further embodiment, upon initiating a fast MCG link recovery procedure at a target cell, the UE does not release resource(s) of a source cell. A channel status of a source PCell may be included in a MCGFailureInformation message when the UE transmits the MCGFailureInformation message. For instance, the channel status of a source PCell represents that the channel is still available, a timer associated with a physical layer problem (e.g., timer T310) is running, and/or a timer associated with a physical layer problem (e.g., timer T310) is not running or not started. Based on the received MCGFailureInformation message, a MN may configure the UE to fall back to the source cell or release resource(s) of the source cell. Specific examples are described in FIG. 4.

According to 3GPP Release 16, after receiving a handover command associated with a DAPS handover procedure, the DAPS handover procedure maintains a source connection (e.g., a PCell) until releasing the source cell after successfully random accessing to a target BS (e.g., a PCell). However, if a DC operation in a source cell can be supported during a DAPS handover procedure, a UE's additional behaviors when the UE releases a source connection have not been specified.

Embodiments of the present application aim to solve this issue and provide solutions regarding a UE's behaviors when the UE releases a source connection. In some embodiments, the UE releases SCG configuration information besides MCG configuration information when the UE release a source connection.

In one embodiment, a UE needs to release a source connection (e.g., of a MCG) when the UE receives a RRCReconfiguration message including daps-SourceRelease IE or the UE performs a RRC re-establishment procedure at a target cell. The UE may further perform the following behaviors when releasing SCG configuration information of the source connection if both of DAPS and DC are supported. Specific examples are described in FIG. 5.

The UE resets SCG MAC configuration information, if configured;
  the UE performs RLC bearer release for each RLC bearer that is part of the SCG configuration information;
  the UE releases the SCG configuration information; and/or
  the UE releases SCell configuration information in a MCG.

Figure 4:
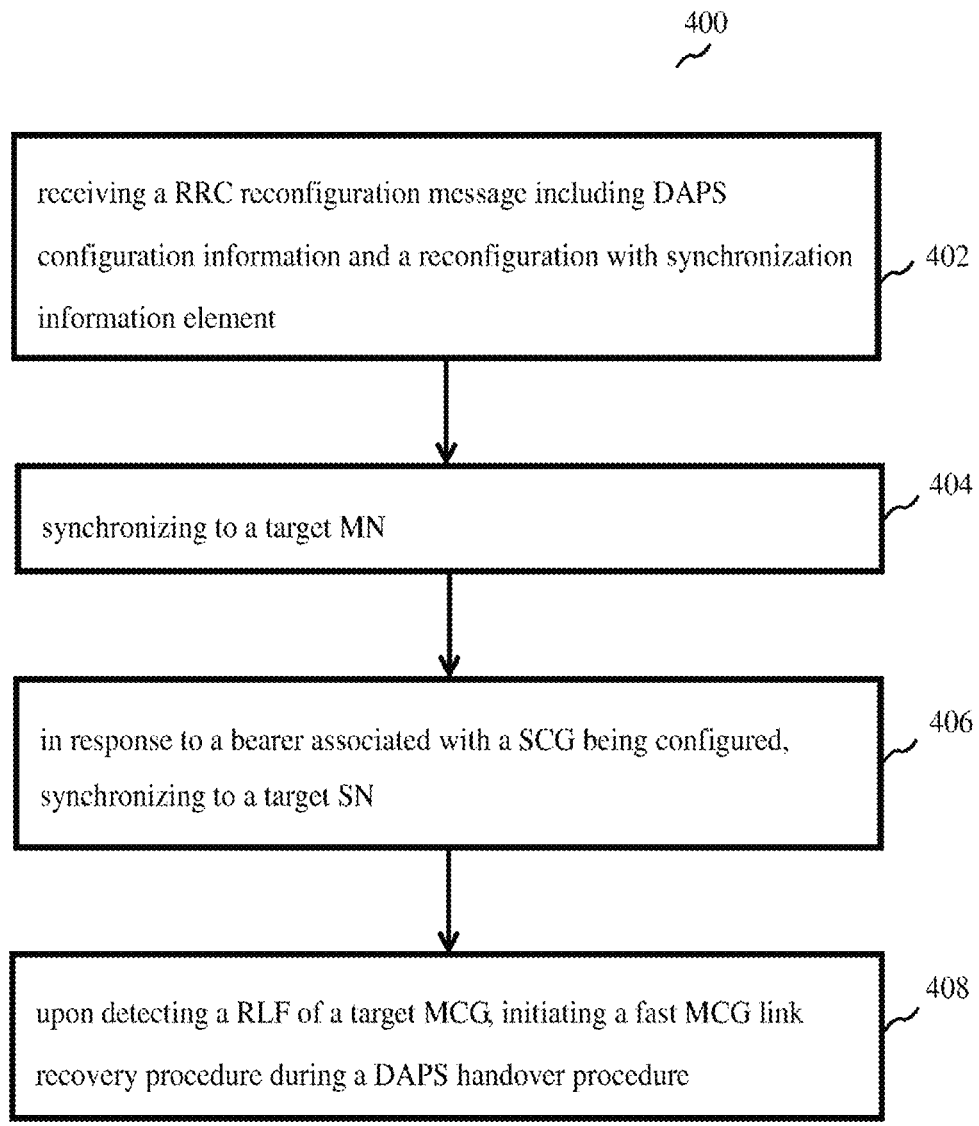
FIG. 4 illustrates a flow chart of a method for a fast MCG link recovery procedure in accordance with some embodiments of the present application.

FIG. 4 illustrates a flow chart of a method for a fast MCG link recovery procedure in accordance with some embodiments of the present application.

The method may be performed by a UE or a Tx UE (e.g., UE 101 as shown and illustrated in FIGS. 1 and 2 or the UE as shown and illustrated in FIG. 3). For example, the UE may be configured with DC, in which the UE is connected to a MN (e.g., MN 102 as shown and illustrated in FIGS. 1 and 2) and a SN 103 (e.g., SN 103 as shown and illustrated in FIG. 1).

In the exemplary method 400 as shown in FIG. 4, in operation 402, a UE may receive a RRC reconfiguration message. The RRC reconfiguration message may include DAPS configuration information and a reconfiguration with synchronization IE. In an embodiment, the RRC reconfiguration message is received if the UE is operating at a RRC connected state. The reconfiguration with synchronization IE may be reconfigurationWithSync IE as specified in 3GPP standard documents.

In operation 404, the UE synchronizes to a target MN. In operation 406, if a bearer associated with a SCG is configured, the UE synchronizes to a target SN.

In some scenarios, the UE may detect a RLF of a target MCG. In an embodiment, the UE detects the RLF before receiving a message indicating to release a source connection. For example, before receiving a RRC reconfiguration message from a target connection which indicates to release a source connection, the UE detects a RLF of a target MCG. In operation 408, upon detecting a RLF of a target MCG, the UE initiates a fast MCG link recovery procedure during a DAPS handover procedure.

In an embodiment, upon if one or more DAPS bearers are configured, initiating the fast MCG link recovery, the UE releases source SpCell configuration information and MAC configuration information of a source connection. The MAC configuration information of a source connection may be named as source MAC configuration information. For example, the source SpCell may be PCell of the MCG or PSCell of the SCG.

In another embodiment, if one or more DAPS bearers are configured, upon initiating the fast MCG link recovery, the UE releases physical channel configuration information for a source SpCell.

In a further embodiment, if one or more DAPS bearers are configured, upon initiating the fast MCG link recovery, the UE resets source MAC configuration information and releases the source MAC configuration information, and the UE discards AS security key(s) used in a source SpCell, if there is any such key(s). For example, the UE discards one or more of the $K_{gNB}$ key, the $K_{RRCenc}$ key, the $K_{RRCint}$ key, the $K_{UPint}$ key, and the $K_{UPenc}$ key.

In a further embodiment, if any DAPS bearer is configured, upon initiating the fast MCG link recovery, the UE perform the following behaviors for each DAPS bearer of the DAPS bearer:
- the UE releases one or more RLC entities and an associated logical channel for a source SpCell; and/or
- the UE reconfigures a packet data convergence protocol (PDCP) entity and releases DAPS configuration information of the each DAPS bearer.

In a further embodiment, if one or more DAPS bearers are configured and if the DAPS bearer is a SRB, upon initiating the fast MCG link recovery, the UE releases a PDCP entity for a source SpCell, and releases a RLC entity and an associated logical channel for the source SpCell.

In an embodiment, the UE transmits a MCG failure information message to the target MN. The MCG failure information message may include a channel status of a source PCell. Then, the UE may receive a response from the target MN. For instance, the response received by the UE may be a RRC reconfiguration message including a fallback indication, a handover command, or an indication to release a source connection.

In one example, if the response is a RRC reconfiguration message which includes the fallback indication, the UE may release configuration information of a target connection and reset MAC configuration information of the target connection. Alternatively, if the response is a RRC reconfiguration message which includes the fallback indication, the UE may resume one or more suspended SRBs in a source connection and revert back to configuration information used in the source connection. After that, the UE may transmit a fallback complete message, e.g., to a source BS. In response to receiving the fallback complete from the UE, the source BS may transmit the fallback complete message to the target cell.

In a further example, if the response is a RRC reconfiguration message which includes the indication to release a source connection, the UE may release source SpCell configuration information and reset MAC configuration information of the source connection.

The embodiments of FIG. 4 may solve the issue of what is a UE's behavior if a RLF happens at the target cell after the UE successfully performs the RA procedure but before releasing the source connection, if DC can be configured to the UE at a target cell during a DAPS handover procedure.

The following texts describe specific Embodiment 1 of the method as shown and illustrated in FIG. 4 for solving the above issue.

According to Embodiment 1, a UE (e.g., UE 101 as shown and illustrated in FIGS. 1 and 2 or a UE as shown and illustrated in FIG. 3), a source BS (e.g., as shown and illustrated in FIG. 3), and a target BS (e.g., as shown and illustrated in FIG. 3) perform the following steps:

(1) A source BS transmits a HANDOVER REQUEST message to a target BS using Xn interface based on the measurement result reported by a UE.

(2) The target BS performs admission control and transmits the new RRC configuration information as a part of the HANDOVER REQUEST ACKNOWLEDGE message to the source BS.

(3) The source BS transmits a RRCReconfiguration message to the UE. The RRCReconfiguration message includes at least cell ID and all information required to access a target cell of the target BS, so that the UE can access the target cell without reading any system information.

DAPS configuration information is configured for at least one data radio bearer (DRB).

(4) The UE successfully random accesses to the target BS. If a RLF happens on MCG of the target cell after UE performs RA successfully but before resource(s) of a source cell of the source BS is released, the UE initiates a fast MCG link recovery procedure. Upon the UE initiating the fast MCG link recovery at the target BS, the UE releases the previous resources of the source cell as follows.

If any DAPS bearer has been configured:
- the UE releases source SpCell configuration information;
- the UE resets the source MAC configuration information and releases the source MAC configuration information;
- for each DAPS bearer, the UE releases a RLC entity or RLC entities and the associated logical channel for the source SpCell, and the UE reconfigures the PDCP entity to release DAPS configuration information;
- for each SRB, the UE releases the PDCP entity for the source SpCell, and the UE releases the RLC entity and the associated logical channel for the source SpCell;
- the UE releases the physical channel configuration information for the source SpCell; and/or
- the UE discards AS security key(s) used in the source SpCell, if any.

(5) The UE transits a MCGFailureInformation message to a MN via a SN at the target cell.

(6) The MN transmits a response, e.g., RRCReconfiguration message including a handover command, to the UE.

(7) The UE takes actions (e.g., a handover procedure or a resource release procedure) according to the received RRCReconfiguration message, and the UE stops timer T316.

The following texts describe specific Embodiment 2 of the method as shown and illustrated in FIG. 4 for solving the above issue.

According to Embodiment 2, a UE (e.g., UE 101 as shown and illustrated in FIGS. 1 and 2 or a UE as shown and illustrated in FIG. 3), a source BS (e.g., as shown and illustrated in FIG. 3), and a target BS (e.g., as shown and illustrated in FIG. 3) perform the following steps:

(1) The source BS transmits a HANDOVER REQUEST to a target BS using Xn interface based on the measurement result reported by a UE.

(2) The target BS performs admission control and transmits the new RRC configuration information as part of the HANDOVER REQUEST ACKNOWLEDGE to the source BS.
(3) The source BS transmits a RRCReconfiguration message to the UE. The RRCReconfiguration message includes at least cell ID and all information required to access the target cell so that the UE can access the target cell without reading any system information.
DAPS configuration information is configured for at least one DRB.
(4) The UE successfully random accesses to the target BS. The UE initiates a fast MCG link recovery procedure if a RLF happens on a MCG of the target cell before releasing the source connection.
(8) The UE transmits a MCGFailureInformation message to a MN via a SN at the target cell.
The channel status of a source PCell (e.g., the channel is still available, timer T310 is running, timer T310 is not running) may be included in the MCGFailureInformation message.
(5) The MN transmits the response to the UE.
The response could be a RRCReconfiguration message including a fall-back indication.
Alternatively, the response could be a RRCReconfiguration message including a handover command and/or an indication to release a source connection.
(6) The UE takes actions (e.g., a handover procedure or a resource release procedure) according to the received RRCReconfiguration message and stops timer T316.

Details described in all other embodiments of the present application (for example, details of how to process a RLF during a DAPS handover procedure) are applicable for the embodiments of FIG. 4. Moreover, details described in the embodiments of FIG. 4 are applicable for all the embodiments of FIGS. 1-3, 5, and 6.

Figure 5:
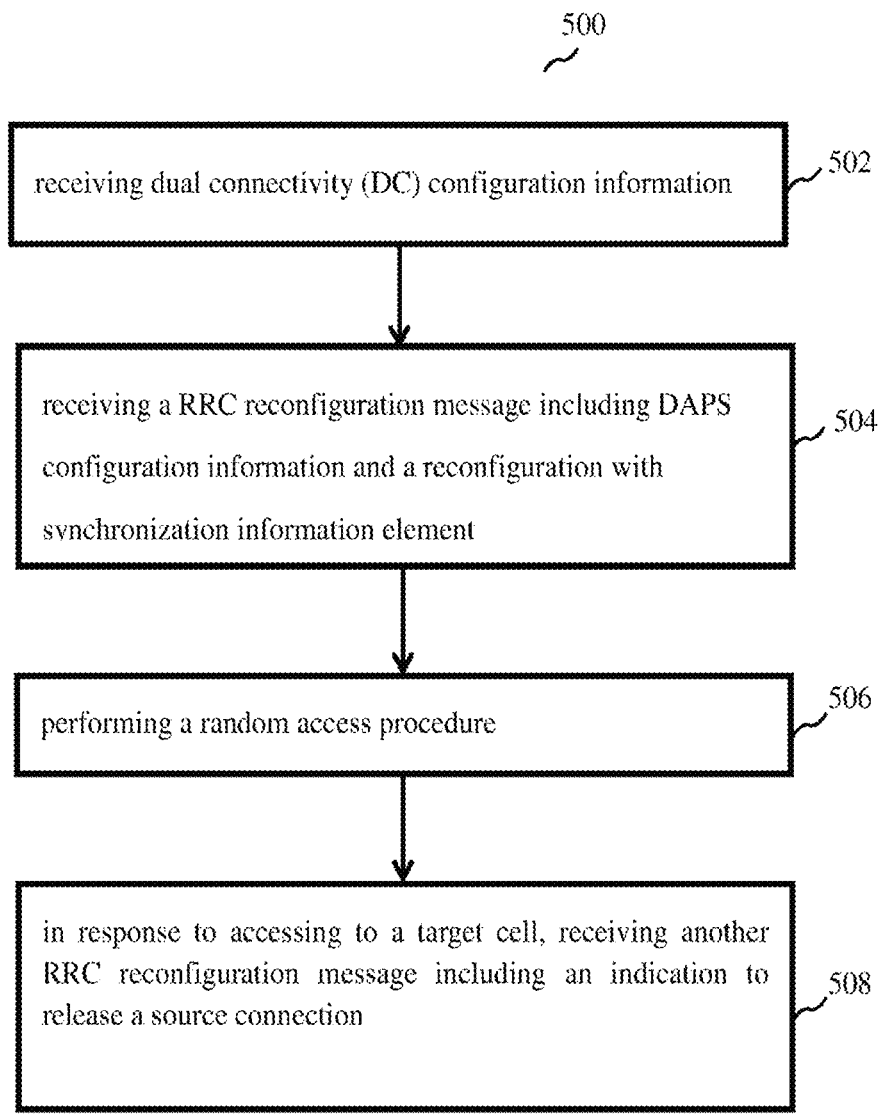
FIG. 5 illustrates a flow chart of a method for a random access procedure in accordance with some embodiments of the present application.

FIG. 5 illustrates a flow chart of a method for a random access procedure in accordance with some embodiments of the present application.

The method may be performed by a UE or a Rx UE (e.g., UE 101 as shown and illustrated in FIGS. 1 and 2 or the UE as shown and illustrated in FIG. 3). For example, the UE may be configured with DC, in which the UE is connected to a MN (e.g., MN 102 as shown and illustrated in FIGS. 1 and 2) and a SN 103 (e.g., SN 103 as shown and illustrated in FIG. 1).

In the exemplary method 500 as shown in FIG. 5, in operation 502, a UE receives DC configuration information. In operation 504, the UE receives a RRC reconfiguration message. The RRC reconfiguration message may include DAPS configuration information and a reconfiguration with synchronization IE. The reconfiguration with synchronization IE may be reconfigurationWithSync IE as specified in 3GPP standard documents. In an embodiment, the RRC reconfiguration message is received if the UE is operating at a RRC connected state.

In operation 506, the UE performs a random access procedure. In operation 508, if the UE accesses to a target cell, the UE receives another RRC reconfiguration message which includes an indication to release a source connection.

In an embodiment, based on the indication to release the source connection, the UE performs a bearer release procedure for each RLC bearer if each RLC bearer is a part of SCG configuration information. In a further embodiment, based on the indication to release the source connection, the UE releases the SCG configuration information. In another embodiment, based on the indication to release the source connection, the UE releases SCell configuration information in a SCG. In an additional embodiment, based on the indication to release the source connection, the UE releases SCell configuration information in a MCG.

In an embodiment, if a SCG is configured, the UE further resets source MAC configuration information for the SCG.

The embodiments of FIG. 5 may solve the issue of what is a UE's additional behaviors when the UE releases the source connection, if DC at a source cell can be supported during a DAPS handover procedure.

The following texts describe specific Embodiment 3 of the method as shown and illustrated in FIG. 5 for solving the above issue.

According to Embodiment 3, a UE (e.g., UE 101 as shown and illustrated in FIGS. 1 and 2 or a UE as shown and illustrated in FIG. 3), a source BS (e.g., as shown and illustrated in FIG. 3), and a target BS (e.g., as shown and illustrated in FIG. 3) perform the following steps:

(1) A source BS transmits a HANDOVER REQUEST to a target BS using Xn interface based on the measurement result reported by a UE.
(2) The target BS performs admission control and transmits the new RRC configuration information as a part of the HANDOVER REQUEST ACKNOWLEDGE to the source BS.
(3) The source BS transmits a RRCReconfiguration message to the UE. The RRCReconfiguration message may include at least cell ID and all information required to access a target cell of the target BS, so that the UE can access the target cell without reading any system information.
DAPS configuration information is configured for at least one DRB.
(4) The UE moves the RRC connection to the target BS and replies with the RRCReconfigurationComplete to the target BS.
(5) The target BS transmits a RRCReconfiguration message including a DAPS release indication to the UE. For example, the DAPS release indication is daps-SourceRelease IE.
(6) The UE releases resource(s) of a source cell after receiving the DAPS release indication.
For a MCG:
the UE resets source MAC and release the source MAC configuration information;
for each DAPS bearer, the UE releases the RLC entity and the associated logical channel for the source cell, and the UE reconfigures the PDCP entity to release DAPS as specified in TS38.323 [5];
for each SRB, the UE releases the PDCP entity for the source cell, and the UE releases the RLC entity and the associated logical channel for the source cell;
the UE releases the physical channel configuration information for the source cell; and/or
the UE discards AS security keys used in the source cell, if any.
For a SCG:
the UE needs to perform the following behaviors when releasing source SCG configuration information:
the UE resets SCG MAC, if the SCG MAC is configured;
the UE performs a RLC bearer release procedure for each RLC bearer that is a part of the SCG configuration information; and/or
the UE releases the SCG configuration information.

For a SCell in a MCG:
- the UE releases SCell configuration information in the MCG; and/or
- the UE a RLC bearer release procedure for each RLC bearer.

Details described in all other embodiments of the present application (for example, details of how to process a RLF during a DAPS handover procedure) are applicable for the embodiments of FIG. 5. Moreover, details described in the embodiments of FIG. 5 are applicable for all the embodiments of FIGS. 1-4 and 6.

Figure 6:
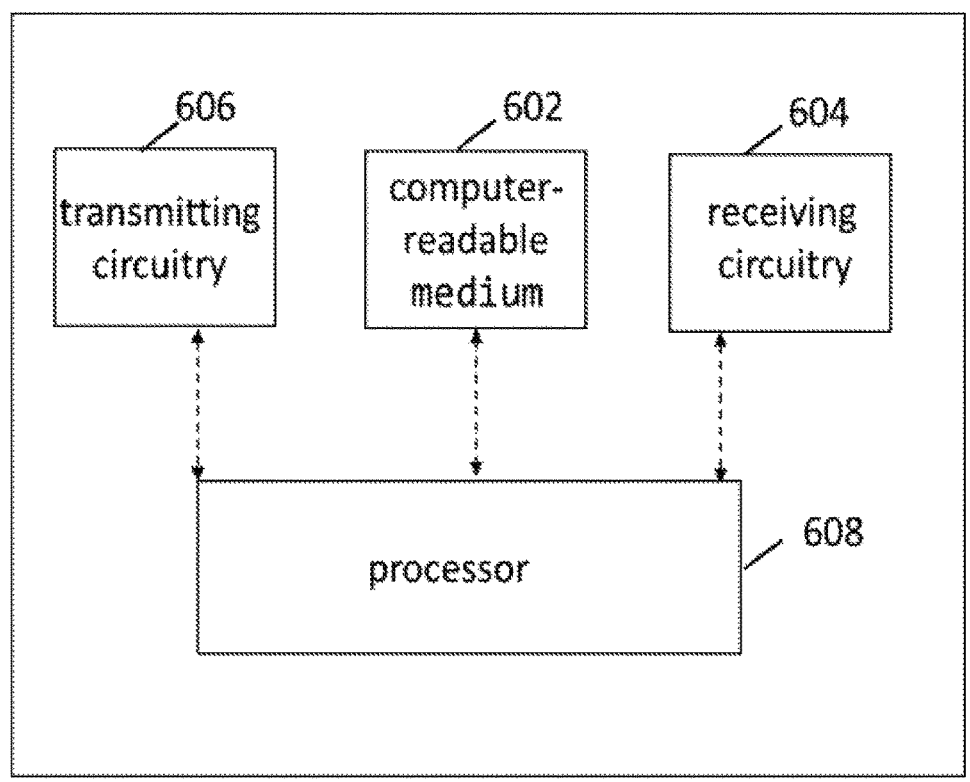
FIG. 6 illustrates a simplified block diagram of an apparatus 600 for an enhanced failure report mechanism in accordance with some embodiments of the present application.

FIG. 6 illustrates a simplified block diagram of an apparatus 600 for an enhanced failure report mechanism in accordance with some embodiments of the present application. The apparatus 600 may be UE 101 as shown and illustrated in FIGS. 1 and 2 or the UE as shown and illustrated in FIG. 3.

Referring to FIG. 6, the apparatus 600 may include at least one non-transitory computer-readable medium 602, at least one receiving circuitry 604, at least one transmitting circuitry 606, and at least one processor 608. In some embodiment of the present application, at least one receiving circuitry 604 and at least one transmitting circuitry 606 and be integrated into at least one transceiver. The at least one non-transitory computer-readable medium 602 may have computer executable instructions stored therein. The at least one processor 608 may be coupled to the at least one non-transitory computer-readable medium 602, the at least one receiving circuitry 604 and the at least one transmitting circuitry 606. The computer executable instructions can be programmed to implement a method with the at least one receiving circuitry 604, the at least one transmitting circuitry 606 and the at least one processor 608. The method can be a method according to an embodiment of the present application, for example, the corresponding method shown in FIG. 4 or FIG. 5.

The method according to embodiments of the present application can also be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this application. For example, an embodiment of the present application provides an apparatus for emotion recognition from speech, including a processor and a memory. Computer programmable instructions for implementing a method for emotion recognition from speech are stored in the memory, and the processor is configured to perform the computer programmable instructions to implement the method for emotion recognition from speech. The method may be a method as stated above or other method according to an embodiment of the present application.

An alternative embodiment preferably implements the methods according to embodiments of the present application in a non-transitory, computer-readable storage medium storing computer programmable instructions. The instructions are preferably executed by computer-executable components preferably integrated with a network security system. The non-transitory, computer-readable storage medium may be stored on any suitable computer readable media such as RAMs, ROMs, flash memory, EEPROMs, optical storage devices (CD or DVD), hard drives, floppy drives, or any suitable device. The computer-executable component is preferably a processor but the instructions may alternatively or additionally be executed by any suitable dedicated hardware device. For example, an embodiment of the present application provides a non-transitory, computer-readable storage medium having computer programmable instructions stored therein. The computer programmable instructions are configured to implement a method for emotion recognition from speech as stated above or other method according to an embodiment of the present application.

While this application has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the application by simply employing the elements of the independent claims. Accordingly, embodiments of the application as set forth herein are intended to be illustrative, not limiting. Various changes may be made without departing from the spirit and scope of the application.

What is claimed is:

1. A user equipment (UE), comprising:
   at least one memory; and
   at least one processor coupled with the at least one memory and configured to cause the UE to:
   receive a radio resource control (RRC) reconfiguration message, wherein the RRC reconfiguration message includes dual active protocol stack (DAPS) configuration information and a reconfiguration with synchronization information element;
   synchronize to a target master node (MN);
   synchronize, in response to a bearer associated with a secondary cell group (SCG) being configured, to a target secondary node (SN); and
   initiate, upon detecting a radio link failure (RLF) of a target master cell group (MCG) and before releasing a source connection for the MCG or the SCG, a fast MCG link recovery procedure during a DAPS handover procedure.

2. The UE of claim 1, wherein the at least one processor is configured to cause the UE to detect the RLF before receiving a second RRC reconfiguration message from a target connection indicating to release the source connection.

3. The UE of claim 1, wherein the at least one processor is configured to cause the UE to:
   upon initiation of the fast MCG link recovery procedure, in response to one or more DAPS bearers being configured:
   release source special cell (SpCell) configuration information; and
   release medium access control (MAC) configuration information of the source connection.

4. The UE of claim 1, wherein the at least one processor is configured to cause the UE to:
   upon initiation of the fast MCG link recovery procedure, in response to one or more DAPS bearers being configured:
   release physical channel configuration information for a source SpCell.

5. The UE of claim 1, wherein the at least one processor is configured to cause the UE to:
upon initiation of the fast MCG link recovery procedure, in response to one or more DAPS bearers being configured:
reset MAC configuration information of the source connection and release the MAC configuration information; and
discard access stratum (AS) security keys used in a source SpCell.

6. The UE of claim 1, wherein the at least one processor is configured to cause the UE to:
upon initiation of the fast MCG link recovery procedure, in response to one or more DAPS bearers being configured:
for each DAPS bearer of the one or more DAPS bearers:
release one or more radio link control (RLC) entities and an associated logical channel for a source SpCell; and
reconfigure a packet data convergence protocol (PDCP) entity and release DAPS configuration information of the each DAPS bearer.

7. The UE of claim 1, wherein the at least one processor is configured to cause the UE to:
upon initiation of the fast MCG link recovery procedure, in response to a DAPS bearer being configured and the DAPS bearer being a signaling radio bearer (SRB):
release a PDCP entity for a source SpCell; and
release a RLC entity and an associated logical channel for the source SpCell.

8. The UE of claim 1, wherein the at least one processor is configured to cause the UE to:
transmit, in response to initiation of the fast MCG link recovery procedure, a MCG failure information message to the target MN,
wherein the MCG failure information message includes a channel status of a source primary cell (PCell).

9. The UE of claim 8, wherein the channel status of the source PCell represents one of:
a timer associated with a physical layer problem is running; or
the timer associated with the physical layer problem is not started.

10. The UE of claim 8, wherein the at least one processor is configured to cause the UE to:
receive a response from the target MN,
wherein the response includes a second RRC reconfiguration message, and the second RRC reconfiguration message includes one of: a fallback indication, a handover command, or an indication to release the source connection.

11. The UE of claim 10, wherein the at least one processor is configured to cause the UE to:
release, in response to the second RRC reconfiguration message including the fallback indication, configuration information of a target connection and reset MAC configuration information of the target connection.

12. The UE of claim 10, wherein the at least one processor is configured to cause the UE to:
resume, in response to the second RRC reconfiguration message including the fallback indication, one or more suspended SRBs in the source connection and revert back to configuration information used in the source connection; and
transmit a fallback complete message.

13. The UE of claim 10, wherein the at least one processor is configured to cause the UE to:
release, in response to the second RRC reconfiguration message including the indication to release the source connection, source special cell (SpCell) configuration information and reset MAC configuration information of the source connection.

14. A user equipment (UE), comprising:
at least one memory; and
at least one processor coupled with the at least one memory and configured to cause the UE to:
receive dual connectivity (DC) configuration information;
receive a first radio resource control (RRC) reconfiguration message, wherein the first RRC reconfiguration message includes dual active protocol stack (DAPS) configuration information and a reconfiguration with synchronization information element;
perform a random access procedure to access a target cell of a master cell group (MCG) or a secondary cell group (SCG); and
receive, in response to the random access procedure, a second RRC reconfiguration message, wherein the second RRC reconfiguration message includes an indication to release a source connection for the MCG or the SCG.

15. The UE of claim 14, based on the indication, the at least one processor is configured to cause the UE to:
reset, in response to the SCG being configured, medium access control (MAC) configuration information of the source connection for the SCG.

16. The UE of claim 14, based on the indication, the at least one processor is configured to cause the UE to:
release, in response to each radio link control (RLC) bearer being associated with SCG configuration information, the each RLC bearer and a corresponding logical channel.

17. The UE of claim 14, based on the indication, the at least one processor is configured to cause the UE to:
release, in response to the SCG being configured, SCG configuration information.

18. The UE of claim 14, based on the indication, the at least one processor is configured to cause the UE to:
release secondary cells (SCell) configuration information in the SCG.

19. A method performed by a user equipment (UE), the method comprising:
receiving a radio resource control (RRC) reconfiguration message, wherein the RRC reconfiguration message includes dual active protocol stack (DAPS) configuration information and a reconfiguration with synchronization information element;
synchronizing to a target master node (MN);
synchronizing, in response to a bearer associated with a secondary cell group (SCG) being configured, to a target secondary node (SN); and
initiating, upon detecting a radio link failure (RLF) of a target master cell group (MCG) and before releasing a source connection for the MCG or the SCG, a fast MCG link recovery procedure during a DAPS handover procedure.

20. A method performed by a user equipment (UE), the method comprising:
receiving dual connectivity (DC) configuration information;
receiving a first radio resource control (RRC) reconfiguration message, wherein the first RRC reconfiguration message includes dual active protocol stack (DAPS) configuration information and a reconfiguration with synchronization information element;

performing a random access procedure to access a target cell of a master cell group (MCG) or a secondary cell group (SCG); and receiving, in response to the random access procedure, a second RRC reconfiguration message, wherein the second RRC reconfiguration message includes an indication to release a source connection for the MCG or the SCG.

* * * * *